United States Patent Office 3,269,935
Patented August 30, 1966

3,269,935
EMULSION BREAKING IN AN ADDUCT SEPARATION PROCESS
Rudolf J. Maas and Gerhard G. Baijle, Amsterdam, Netherlands, assignors, by mesne assignments, to Shell Oil Company, New York, N.Y., a corporation of Delaware
No Drawing. Filed June 6, 1963, Ser. No. 285,864
Claims priority, application Netherlands, June 14, 1962, 279,702
17 Claims. (Cl. 208—25)

This invention relates to an improved extractive crystallization separation process. More particularly, the invention relates to an improvement of such a process wherein emulsions which may be present either during and/or after the decomposition step are prevented or broken.

It is known in the art that one may fractionate a mixture of organic compounds by bringing the mixture into contact with an aqueous, or mainly aqueous, solution of an adduct-forming agent, such as urea or thiourea, whereby adducts are formed between a compound or group of compounds of the mixture and the adduct-forming agent, after which such adducts, or the aqueous solution together with such adducts, are separated from the remainder of the mixture, and the adduct obtained is decomposed in the presence of water into adduct former and the compound or groups of compounds.

In such a process adduct formation is usually caused by mixing the mixture of organic compounds to be fractioned with an aqueous solution of urea or thiourea. The adduct formed is separated together with, at least a part of, the aqueous solution of the adduct former. Provided the concentration of the solution of adduct former is the appropriate one, the adduct, together with the water in which the adduct former was dissolved, forms a mixture that behaves as a solid, in which an excess of adduct former may be present. The separation of this mixture with the behavior of a solid can be facilitated if a solvent, for instance dichloromethane, is added to the mixture of organic compounds to be fractionated. This solvent can also be used for washing the adduct after it has been separated. From the point of view of process economy it is of course desirable that the solvent should be recovered.

The adduct produced is decomposed in the presence of water into the compound or group of compounds and adduct former. The resultant two-phase system, consisting of a liquid phase of the separated compound or group of compounds and an aqueous phase containing the adduct former, is separated, if so desired after having been left in a settling chamber, after which the separated compound or group of compounds is recovered.

It has now been observed that, during and/or after the decomposition of the adduct, an emulsion may be formed which is present in the decomposition zone or in the settling zone and which in continuous operation may increase in volume to such an extent that the separation into compound or group of compounds and solution of adduct former becomes impossible.

It is known also in the art that emulsion formation upon decomposition of the adduct may be suppressed by the presence of a water-soluble inorganic salt.

However, in accordance with the instant invention, a novel alternative means of breaking the emulsion or preventing the tendency of the solution of adduct former and compound to form an emulsion is achieved by the addition of an organic liquid. In other words, the invention relates to a process for the fractionation of a mixture of organic compounds by bringing the mixture into contact with an aqueous, or mainly aqueous, solution of urea or thiourea as adduct-forming agent, which causes adducts to be formed between a compound or group of compounds of the mixture and the adduct-forming agent, after which such adducts, or the aqueous solution together with such adducts, are separated from the rest of the mixture and the adduct obtained is decomposed into adduct former and separated compound or group of compounds, any emulsion formed from the compound or group of compounds separated and the solution of adduct former during and/or after the decomposition of the adduct is broken, or the formation of such emulsion is prevented by means of adding an organic liquid having a dielectric constant of 4–6.5 at 25° C.

The organic compound to be applied can be added in the decomposition zone or in the settling zone. Any emulsion present then breaks down almost immediately, or very soon, into its component parts or is substantially prevented from forming at all.

In principle the present process is applicable to various methods for forming adducts; the adduct-former may be present in excess or in an underdose; the contact between the solution of adduct former and the mixture to be fractionated may be brought about continuously or intermittently, for instance, in a vessel provided with a stirring device, in a counter-current or cocurrent contacting apparatus, or the like. Adduct formation may be effected in one stage or in several stages, if desired at different temperatures. If, before adduct formation, the organic compounds to be separated are diluted with a solvent, such solvent must be one, such as dichloromethane, that, under the operational conditions applied, forms no adducts or at least almost none.

The separate recovery of the adducts and the remainder of the starting mixture of organic compounds may, for instance, be effected with the aid of one or more filters, screens, centrifuges or combinations of these arranged behind the adduct-forming unit. It is, however, also possible that the adducts and the remaining part of the starting mixture already flow out separately from the adduct-forming unit; this may for instance, be the case when use is made of a unit operating counter currently. Any adduct former still present will usually be recovered with the adduct; any washing liquid used for the adducts will, at least for the greater part, be obtained in the remaining liquid and recovered therefrom. If the mixture of organic compounds was diluted with a slovent before the adduct formation, the solvent is also used as the washing liquid for the adduct. In that case the washing liquid will generally be recycled and added to the mixture to be fractionated and the solvent recovered from the remaining liquid obtained upon separation of the adduct.

The present process may be carried out in such a manner that the adduct former is obtained partially or entirely in solution when the adducts are decomposed, depending on the amount of water that is present when the adduct is decomposed in the decomposition chamber.

The adduct is decomposed at a temperature higher than that at which adduct formation occurs; this difference in temperature is, for instance, 20° C. or more. If the decomposition products are conveyed into a settling chamber after decomposition, the emulsion formed collects in this settling chamber. The discharge of separate streams of organic compound or group of compounds and aqueous solution of adduct former is hampered by the emulsion, and in continuous operation of the installation, because the amount of emulsion in the settling chamber continually accumulates, this even becomes impossible.

In continuous operation the emulsion is often formed only after some time, namely in cases when there is some impurity in the mixture to be fractionated which acts as an emulsifier and whose concentration is so low that it does not immediately cause emulsification but only after its concentration has increased as a result of the continuous operation of the process in which solutions and other streams of liquid are recirculated.

Many different compounds are suitable as the organic liquid with a dielectric constant of 4–6.5 at 25° C., which is employed to break or to prevent formation of the emulsion. As examples of such compounds are ethers, such as dimethyl ether, diethyl ether and dipropyl ether; esters, such as ethyl acetate, butyl acetate, methyl propionate, methyl butyrate, ethyl butyrate, phenyl acetate and benzyl acetate; alcohols, such as 2-methyl butanol-2; amines, such as dimethyl amine, isopropyl amine, piperidine, N-methyl aniline and o-, m- and p-toluidine; and hydrocarbon halides, such as chloroform, bromoform, chlorobenzene, bromobenzene, m-dichlorobenzene, o-, m- and p-chlorotoluene, o- m- and p-bromotoluene and others.

Of these classes of compounds the aliphatic halogen compounds, as well as the aromatic halogen compounds, are particularly suitable in view of their resistance to decomposition in continuous operation. Of the aliphatic halogen compounds, chloroform is preferred; while of the aromatic halogen compounds, chlorobenzene is particularly suitable.

It is an advantage, however, to separate the non-emulsified constituents from the emulsion before breaking the emulsion. This makes it easier to determine the dosage of the organic liquid and the latter can be recovered from a mixture having a smaller volume than if the organic liquid is added to the total contents of the decomposition chamber or settling chamber.

Preferably, the mixture obtained upon decomposition of the adduct is passed into a settling chamber and the emulsion that collects at the interface between the component or group of components and the solution of adduct former is separated, after which the emulsion is broken and the component or group of components ond the solution of adduct former thus obtained are separated.

The emulsion is preferably removed from the settling chamber by means of one or more discharge devices assembled in the settling chamber at the level of the interface between the component and the adduct former, consisting preferably of a system of discharge tubes connected to tubes passing through the side of the settling chamber in the liquid at the level of the aforesaid interface, which tubes have apertures in their walls, towards the interface. The system of discharge tubes may be connected to a pump issuing in the chamber in which the emulsion fed in is broken, the delivery of the pump being adjusted dependent on the intake velocity of the mixture coming from the decomposition chamber. The distance of the interface from the discharge apertures for the emulsion may be kept constant by regulating the discharge velocity of the phase constituting the bottom layer in the settling tank by a pump whose delivery is controlled by a level indicated of the interface.

The two-phase system obtained after demulsification may be separated into the two phases by any known means.

For economical operation it is of particular importance that the organic liquid used as demulsifying agent is recovered from the compound or group of compounds and solution of adduct forming agent obtained after demulsification and recirculated. It is also an advantage to recirculate the solution of adduct forming agent obtained after demulsification, after it has, if necessary, been reconcentrated.

When the process is continuous it is of importance to avert emulsion formation by preventing the building up of higher concentrations in the adduct of impurities that act as emulsifier. This can be done while the continuous process is being started up, by discharging a slip stream from the settling chamber at the level of the interface between the two phases. An organic liquid that is not soluble in the solution of adduct former, but is soluble in, or miscible with, the phase formed from the separated component or group of components, is then chosen for the demulsifying agent. The traces of any solvent that may have been used are removed first from the slip stream and then the demulsifying agent is added. Subsequently, the resultant solution of the compound or group of compounds in the demulsifying agent is separated from the solution of adduct former, after which the solution of adduct former, after reconcentration if required, is recirculated into the process and the demulsifying agent is recovered from the solution of compound or group of compounds by distilling, and used again.

The amount of demulsifying agent that is required for breaking the emulsion or to prevent its formation may vary from case to case and can easily be determined experimentally. In general, a quantity of 200% by volume, calculated on the amount of the compound or group of compounds present in the emulsion or in the slip stream, is sufficient.

Mixtures that are suitable for the treatment with urea (if desired, containing biuret) or thiourea are those containing straight-chain compounds in addition to other compounds; when urea is applied the former are the preferentially adduct-yielding components; the other components produce adducts with greater difficulty or not at all. When the thiourea is used the reverse is true.

The process according to the invention is in particular very suitable for treating with urea or thiourea mixtures containing straight-chain hydrocarbons, in particular paraffinic straight-chain hydrocarbons, in addition to other hydrocarbons.

It is observed that the concentration of emulsion-forming contaminants may in certain cases be considerably reduced by subjecting the starting material to distillation, as, for instance, when the starting material consists of paraffinic hydrocarbons. The emulsion-forming impurities are then likely to consist of oxidation products that are present in low concentrations and which are largely left to the residue upon distillation.

The previous removal of some of the impurities is of advantage because the emulsions formed during and/or after decomposition of the adduct are less refractory, or need less demulsifying agent to deal with them. Of course, every care should be taken to prevent fresh formation of emulsifiers after the aforesaid distillation. This can be avoided by immediately processing the distilled product or storing it under inert gas.

Suitable hydrocarbon mixtures to which the process according to the invention can be applied are mineral oil fractions obtained by direct distillation (in one or more stages), in particular gas oils and high-boiling distillates with a high wax content obtained by vacuum distillation, such as, for instance, those that can be obtained from certain crude oils from the Far East. (By fractions obtained by direct distillation are also meant wax-containing fractions from which part of the paraffins, or part of the non-paraffins, has in some way been removed, such as a partially dewaxed oil or an oil-containing paraffin wax, such as slack wax).

Other suitable hydrocarbon mixtures are catalytically cracked recycle oils, in particular heavy ones and raffinates, obtained when such oils are treated with a solvent selective to aromatics, such as furfural.

The invention is elucidated by the following examples.

*Example 1*

2 grams of a waxy residue with a boiling range of 475–500° C. (76 cm. mercury pressure), obtained by redistillation under vacuum of a waxy distillate with a boiling range of 350–500° C. (76 cm. mercury pressure), which distillate had been obtained from a crude oil originating from the Far East, was intensively shaken at room temperature with 25 ml. of water. An emulsion was formed from which no water or oily phase separated after it had stood for 24 hours at room temperature.

Subsequently, 2 gram samples of the waxy residue were intensively shaken at the same temperature with 25 ml. of water and 25 ml. of one of the following organic liquids: carbon tetrachloride, benzene, xylene, chloroform, dimethyl ether, chlorobenzene, ethyl acetate, n-butyl alcohol and dichloromethane. Then the time elapsing until the emulsion had completely split up into two phases was measured. The results are presented in Table I.

TABLE I

| Organic liquid added | Dielectric Constant at 25° C. | Time required for complete separation |
| --- | --- | --- |
| None | | More than 24 hours. |
| Carbon tetrachloride | 2.2 | More than 2 hours. |
| Benzene | 2.3 | Do. |
| Xylene | 2.7 | Do. |
| Chloroform | 4.7 | Less than 30 seconds. |
| Dimethylether | 5.0 | Do. |
| Chlorobenzene | 5.6 | Do. |
| Ethyl acetate | 6.0 | Do. |
| n-Butyl alcohol | 7.8 | More than 10 hours. |
| Dichloromethane | 9.1 | More than 24 hours. |

*Example II*

Solutions were prepared of the same waxy residue as described in Example I in chloroform. The solutions each contained 25% by volume of waxy residue. The solutions were shaken at various temperatures for 30 minutes in an autoclave provided with a thermostat and a sightglass, with aqueous urea solutions of various concentrations. The time required for complete phase separation was then measured. The results are presented in Table II.

TABLE II

| Temperature, ° C. | Concentration of urea, Percent, w. | Time required for phase separation, minutes |
| --- | --- | --- |
| 80 | 60 | 2 |
| 60 | 60 | (¹) |
| 60 | 40 | 0.2 |
| 40 | 40 | 2 |
| 40 | 20 | 0.4 |

¹ Owing to adduct formation, no separation.

*Example III*

In an installation for the preparation of paraffin wax having mainly straight chain compounds, the process according to the invention was operated continuously in the following manner:

A waxy distillate with a boiling range of about 350–500° C. (76 cm. mercury pressure) was passed, at a rate of 5.18 tons per hour, into the first of three reactors provided with stirring devices and connected in series. At the same time to this reactor were fed 21.4 tons of dichloromethane per hour and a 76% w. aqueous solution of urea heated at 85° C., at a rate of 8.53 tons per hour. By applying a slight vacuum, so that the pressure in the first reactor was 0.7–0.9 atmosphere, 6.36 tons of dichloromethane per hour were removed as vapor and subjected to condensation, so that the temperature of the mixture in the first reactor came to lie between 30 and 37° C. In this temperature range the urea forms an adduct with the straight-chain paraffins. The suspension of the mixture of adduct, water and urea, which behaves like a solid, in the solution of oil in dichloromethane as the continuous phase was pumped into reactors 2 and 3 and then passed from the third reactor onto a continuous band cell filter and, at the end of the filter, washed with dichloromethane at a rate of 10.71 tons of dichloromethane per hour. The spent wash liquor was passed to the first reactor. The filtrate was separated into oil and dichloromethane by distillation in a column. The quantity of oil recovered was 4.22 tons per hour. The dichloromethane obtained was used as wash liquid for the solid matter.

As required, part of the first filtrate was passed to the first reactor in order to keep the suspension pumpable.

The washed solid matter was introduced into a decomposition reactor, where water was added at a rate of 0.92 ton per hour. The temperature in the decomposition reactor was 85–90° C. The two-phase system formed was passed into a settling tank, in which were formed an upper phase consisting of wax and a small quantity of dichloromethane and a lower phase consisting of a urea solution.

From this settling tank a slip stream was discharged via two tubes installed parallel to the interface between the phases, passing through the tank wall and closed at the end. The tube walls were provided with openings lying on one straight line. The tubes had been mounted in such a way that one tube was in the lower phase near the interface and the other in the upper phase near the interface, both with the openings in the tube wall towards the interface. By stripping the small quantities of dichloromethane were removed from the slip stream and recovered. To the stripped slip stream chloroform was added in a proportion of 200% v. chloroform calculated on the quantity of paraffin wax in the slip stream, which amounted to 0.1 ton paraffin wax per hour. At the same time, the slip stream was diluted with water to a urea content of the water phase of 60% w. The mixture was passed into a settling tank intended for the slip stream. After the two phases formed in this settling tank had been recovered, from either phase the demulsifying agent was removed by distillation and recycled to the slip stream. The wax recovered, together with the wax from the first settling tank, was discharged as product. The total quantity of wax was 0.96 ton per hour. The urea solution was combined with the urea solution from the first settling tank and, after filtration and treatment with activated charcoal, reconcentrated in a vacuum tower by evaporation of the water added in the decomposition reactor. The 76% w. urea solution recovered was used again for adduct formation by recycling it to the first reactor.

By applying the above-described process without discharging a slip stream and treating it with chloroform an emulsion formed at the interface between the two phases in the first settling tank which increased in volume during the process and after nine hours rendered separation into a wax phase and aqueous phase impossible.

We claim as our invention:

1. In a process for the fractionation of a mixture of hydrocarbons comprising at least one compound capable of forming solid adducts by
    (a) bringing the mixture into contact with a substantially aqueous solution of an adduct forming agent selected from the group consisting of urea and thiourea whereby adducts are formed between at least one compound of the mixture and the adduct forming agent,
    (b) separating said adducts from the rest of the mixture, and,
    (c) decomposing said adduct in the presence of water into a mixture of adduct forming agent and the compounds capable of forming said adducts and wherein an emulsion tends to form from the adduct forming compound and the solution of adduct former, the improvement comprising,
    (d) adding an organic liquid having a dielectric constant of 4–6.5 at 25° C. to the mixture of step (c) whereby the tendency of said mixture to form an emulsion is substantially reduced and whereby any of said emulsion formed is broken after separation of the non-emulsified compounds.

2. The process of claim 1 wherein the organic liquid is an organic halogen compound.

3. The process of claim 2 wherein the organic liquid is an aliphatic halogen compound.

4. The process of claim 3 wherein the organic liquid is chloroform.

5. The process of claim 2 wherein the organic liquid is an aromatic halogen compound.

6. The process of claim 5 wherein the organic liquid is chlorobenzene.

7. The process of claim 1 wherein the mixture obtained upon decomposition of the adduct is passed into a settling zone, said emulsion layer collecting at the interface between separated compound and solution of adduct forming agent is separated, after which the emulsion is broken and the compound and solution of adduct forming agent thus obtained are separated.

8. The process of claim 7 wherein the emulsion is separated by discharging a slip stream from the settling zone at the level of the interface between the compound and the solution of adduct forming agent.

9. The process of claim 1 wherein the organic liquid used as demulsifying agent is recovered from the compound and solution of adduct forming agent obtained after demulsification, and recirculated.

10. The process of claim 1 wherein the solution of adduct forming agent obtained after demulsification is recirculated.

11. A continuous process for the separation of hydrocarbons comprising at least one compound capable of forming an adduct, by adduct formation in the presence of a solvent with an adduct forming agent selected from the group consisting of urea and thiourea which comprises passing the mixture obtained upon decomposition of the adduct into a settling zone; withdrawing a slip stream from said zone at the level of the interface between the two phases formed in the settling zone; discharging the upper layer from the upper part of the settling zone; recovering the compound capable of forming an adduct and any solvent present; discharging the bottom phase containing adduct forming agent into a lower part of the settling zone reconcentrating and recirculating said adduct forming agent to the system; contacting the slip stream, after removal of any solvent, with an organic liquid having a dielectric constant of 4–6.5 at 25° C. that is not soluble in the solution of adduct forming agent and is miscible with the phase formed from the compound capable of forming an adduct and whereby any emulsion which tends to form is broken; and reconcentrating and returning the solution of adduct forming agent as well as the organic liquid recovered from the solution of compound to the process.

12. The process of claim 1 wherein the mixture to be fractionated is a hydrocarbon mixture and contains straight chain paraffinic hydrocarbons.

13. The process of claim 12 wherein the mixture to be fractionated is a mineral oil fraction obtained by direct distillation.

14. The process of claim 13 wherein the mixture to be fractionated is a gas oil.

15. The process of claim 13 wherein the mixture to be fractionated is a high-boiling distillate with a high wax content, obtained by vacuum distillation.

16. The process of claim 12 wherein the mixture to be fractionated is a catalytically cracked recycle oil.

17. The process of claim 16 wherein the mixture to be fractionated is a raffinate obtained by extracting a catalytically cracked recycle oil with a solvent selective for aromatics.

References Cited by the Examiner
UNITED STATES PATENTS

| | | | |
|---|---|---|---|
| 2,557,257 | 6/1951 | Melrose | 208—25 |
| 2,719,106 | 9/1955 | Champagnat | 260—96.5 |
| 2,726,212 | 12/1955 | Weitkamp et al. | 260—96.5 |
| 2,872,409 | 2/1959 | Franz et al. | 208—25 |
| 2,917,446 | 12/1959 | Jurado | 208—25 |
| 3,071,534 | 1/1963 | Hoppe et al. | 208—25 |

DELBERT E. GANTZ, *Primary Examiner.*

ALPHONSO D. SULLIVAN, *Examiner.*

H. LEVINE, *Assistant Examiner.*